(12) United States Patent
Donovan et al.

(10) Patent No.: US 8,046,626 B2
(45) Date of Patent: Oct. 25, 2011

(54) SYSTEM AND METHOD FOR MAINTAINING RESILIENCY OF SUBSCRIPTIONS TO AN EVENT SERVER

(75) Inventors: Steven R. Donovan, Plano, TX (US); Adam B. Roach, Dallas, TX (US); Ben A. Campbell, Irving, TX (US); Ajay P. Deo, Lewisville, TX (US)

(73) Assignee: Cisco Technology, Inc., San Jose, CA (US)

( * ) Notice: Subject to any disclaimer, the term of this patent is extended or adjusted under 35 U.S.C. 154(b) by 621 days.

(21) Appl. No.: 11/844,656

(22) Filed: Aug. 24, 2007
(Under 37 CFR 1.47)

(65) Prior Publication Data
US 2008/0052556 A1    Feb. 28, 2008

Related U.S. Application Data

(60) Provisional application No. 60/823,530, filed on Aug. 25, 2006.

(51) Int. Cl.
*G06F 11/00* (2006.01)

(52) U.S. Cl. ....... 714/4.11; 709/223; 709/227; 709/203; 709/221; 370/216; 719/318; 714/15

(58) Field of Classification Search ................. 714/15, 714/16; 719/138
See application file for complete search history.

(56) References Cited

U.S. PATENT DOCUMENTS

| | | | | |
|---|---|---|---|---|
| 5,809,145 A * | 9/1998 | Slik et al. | ......................... | 705/52 |
| 5,987,506 A * | 11/1999 | Carter et al. | ................... | 709/213 |
| 6,457,142 B1 * | 9/2002 | Klemm et al. | ................... | 714/38 |
| 6,467,052 B1 * | 10/2002 | Kaler et al. | ...................... | 714/39 |
| 6,725,281 B1 * | 4/2004 | Zintel et al. | ................... | 719/318 |
| 6,823,524 B1 * | 11/2004 | Hewett | ........................... | 719/318 |
| 6,859,834 B1 * | 2/2005 | Arora et al. | .................... | 709/227 |
| 7,043,727 B2 * | 5/2006 | Bennett et al. | ................ | 718/100 |
| 7,082,446 B1 * | 7/2006 | Bottomley | ............................ | 1/1 |
| 2002/0016867 A1 * | 2/2002 | Kampe et al. | ................... | 709/318 |
| 2003/0014462 A1 * | 1/2003 | Bennett et al. | ................ | 709/100 |
| 2003/0018830 A1 * | 1/2003 | Chen et al. | ..................... | 709/328 |
| 2003/0074446 A1 * | 4/2003 | Musante et al. | ............... | 709/224 |
| 2003/0088620 A1 * | 5/2003 | Kermarrec et al. | ........... | 709/204 |
| 2003/0126315 A1 * | 7/2003 | Tan et al. | ........................... | 710/1 |
| 2004/0006652 A1 * | 1/2004 | Prall et al. | ..................... | 709/318 |
| 2004/0025171 A1 * | 2/2004 | Barinov et al. | ................ | 719/318 |
| 2005/0144269 A1 * | 6/2005 | Banatwala et al. | ........... | 709/223 |
| 2005/0283477 A1 * | 12/2005 | Donovan et al. | .................. | 707/8 |

(Continued)

OTHER PUBLICATIONS

A.B. Roach, J. Rosenberg, and B. Campbell, "A Session Initiation Protocol (SIP) Event Notification Extension for Resource Lists" draft-ietf-simple-event-list-04, Network Working Group, Internet-Draft, 42 pgs. Jun. 2003.

(Continued)

*Primary Examiner* — Robert Beausoliel, Jr.
*Assistant Examiner* — Jeison C Arcos
(74) *Attorney, Agent, or Firm* — Baker Botts L.L.P.

(57) ABSTRACT

A system and method for maintaining resiliency of subscriptions to an event server includes receiving a subscription request to establish a subscription to receive event state information of an event source, a primary event server providing the event state information. The event state information is received from the primary event server in accordance with the subscription request. The primary event server provides the event state information to an event consumer. It is determined whether the primary event server fails during the subscription.

17 Claims, 3 Drawing Sheets

U.S. PATENT DOCUMENTS

| | | | |
|---|---|---|---|
| 2006/0015871 A1* | 1/2006 | Emaru et al. | 718/100 |
| 2006/0041660 A1* | 2/2006 | Bishop et al. | 709/224 |
| 2006/0059171 A1* | 3/2006 | Borthakur et al. | 707/100 |
| 2006/0262915 A1* | 11/2006 | Marascio et al. | 379/201.01 |

OTHER PUBLICATIONS

T. Berners-Lee, R. Fielding, U.C. Irvine, L. Masinter, Uniform Resource Identifiers (URI): Generic Syntax, Network Working Group, RFC 2396, Updates: 1808, 1738, 40 pgs. Aug. 1998.

J. Rosenberg, H. Schulzrinne, G. Camarillo, A. Johnston, J. Peterson, R. Sparks, M. Handley, and E. Schooler, "SIP: Session Initiation Protocol," Network Working Group, RFC 3261, Obsoletes: 2543, 265 pgs. Jun. 2002.

A.B. Roach, "Session Initiation Protocol (SIP)—Specific Event Notification," Network Working Group, RFC 3265, Updates: 2543, 38 pgs. Jun. 2002.

J. Rosenberg, A Presence Event Package for the Session Initiation Protocol (SIP), draft-ietf-simple-presence-10.txt, Internet Engineering Task Force (IETF), 25 pgs. Jan. 31, 2003.

P. Saint-Andre, Extensible Messaging and Presence Protocol (XMPP): Instant Messaging and Presence, draft-ietf-xmpp-im-22, XMPP Working Group, 101 pgs. Apr. 12, 2004.

3GPP™, 3rd Generation Partnership Project; Technical Specification Group Services and System Aspects; Presence Service; Architecture and functional description (Release 6), 3GPP TS 23.141 V.6.7.0, 34 pgs. Sep. 2004.

* cited by examiner

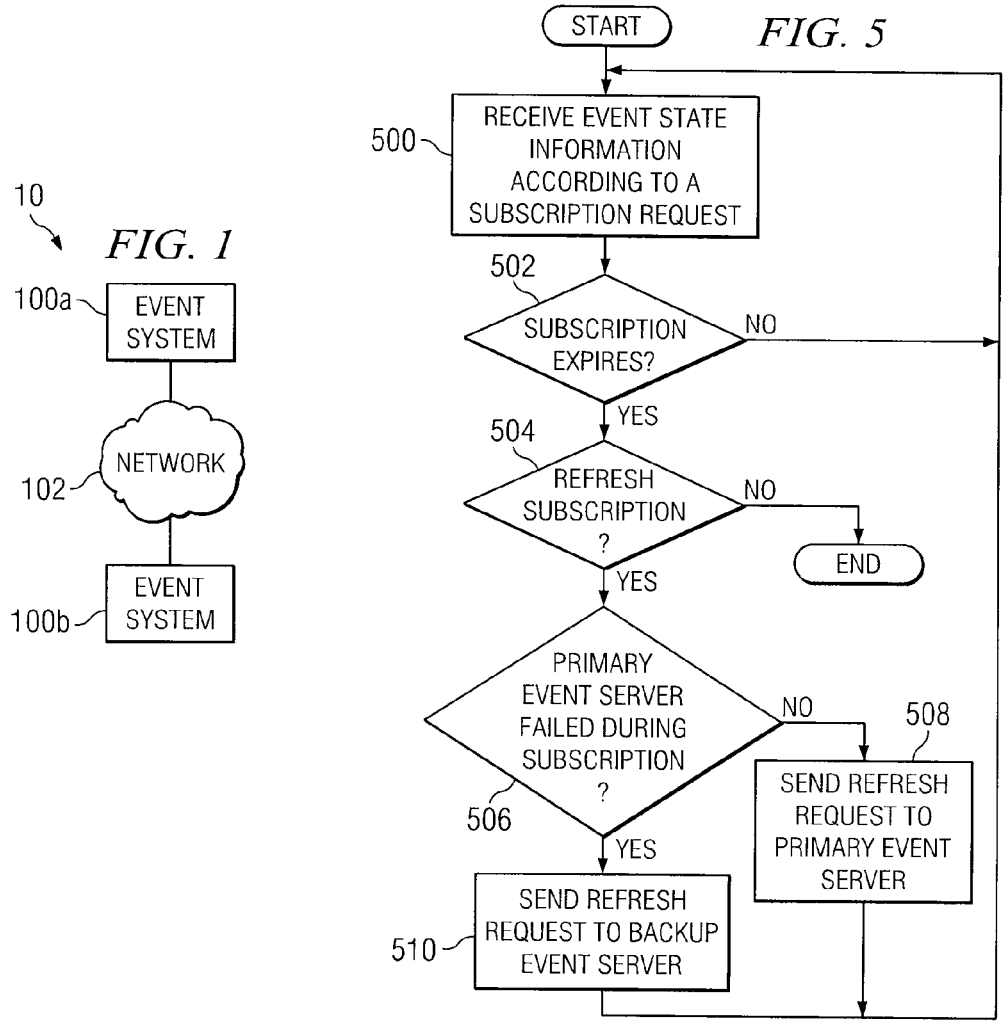
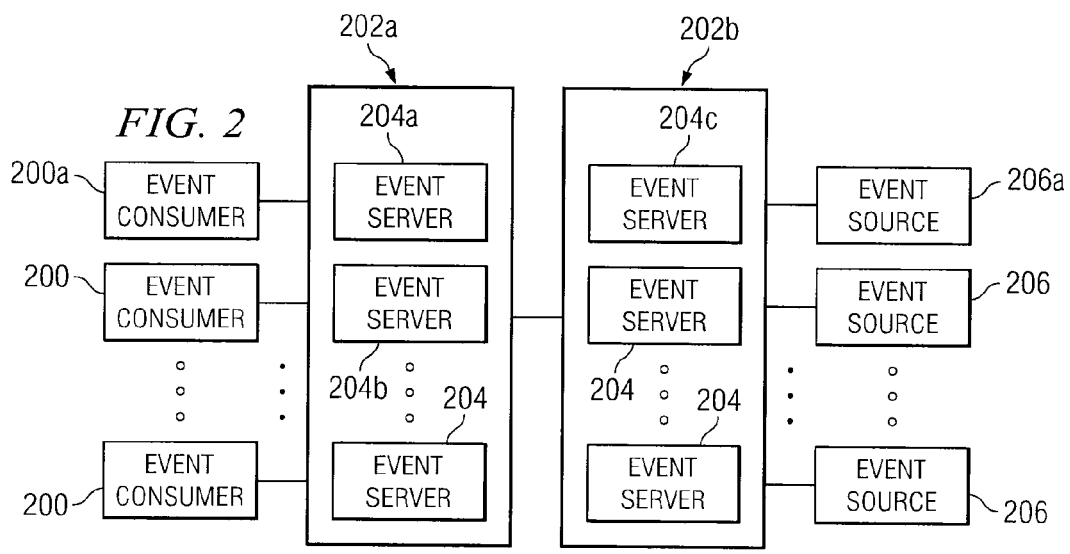

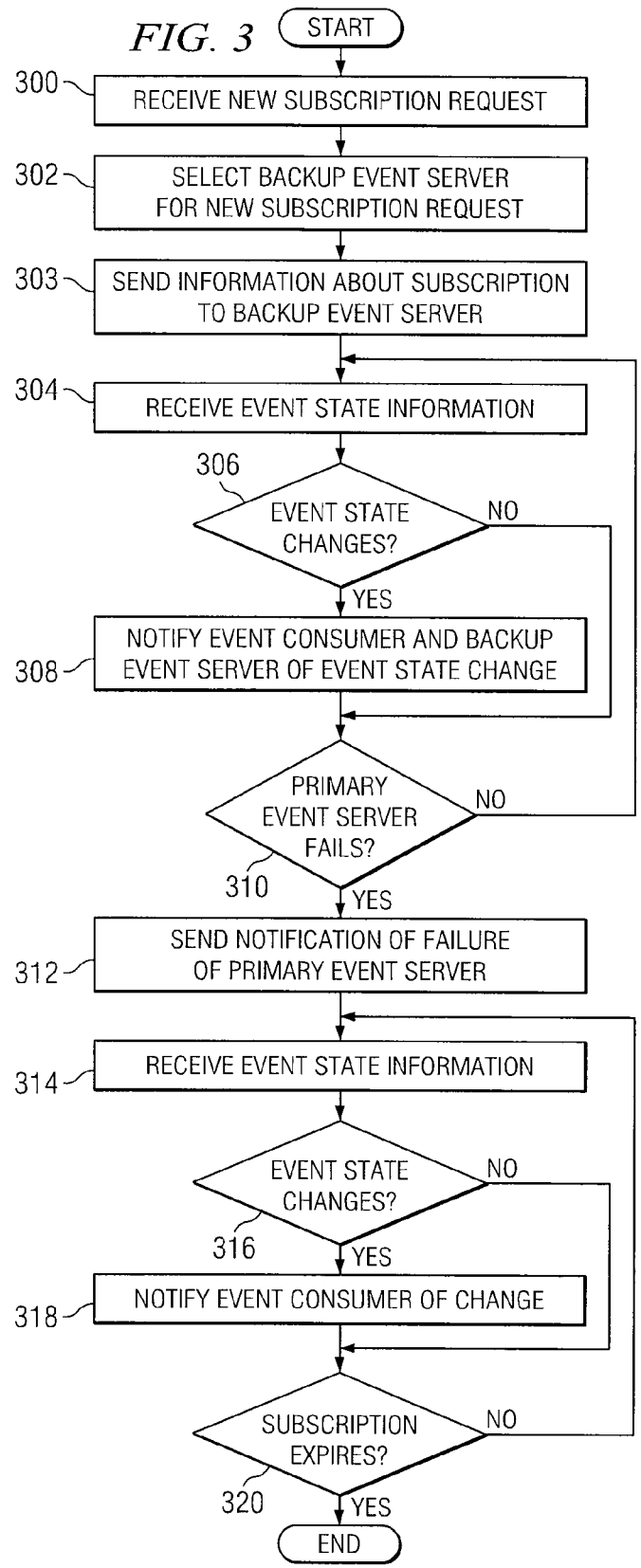

SYSTEM AND METHOD FOR MAINTAINING RESILIENCY OF SUBSCRIPTIONS TO AN EVENT SERVER

RELATED APPLICATION

This patent application claims priority from Patent Application Ser. No. 60/823,530, filed Aug. 25, 2006, entitled System and Method for Maintaining Resiliency of Subscriptions to an Event Server.

TECHNICAL FIELD OF THE INVENTION

This invention relates generally to the field of communications and more specifically to a system and method for maintaining resiliency of subscriptions to an event server.

BACKGROUND

System users interact and communicate using various types of network devices such as desktop computers, laptop computers, personal digital assistants, desktop phones, cell phones, and other devices. Systems and methods have been developed to determine whether certain system users are connected to a network and available for communication through one or more of those network devices.

A consumer establishes a subscription with an event server to receive the status of a source. When the source changes its status, a notification is sent to the consumer. In conventional systems, failure of the event server can cause the loss of many subscriptions. Consequently, a restart problem occurs in the system when users attempt to re-establish the subscription. Additionally, failure of the event server results in the loss of notifications during the time the user attempts to re-establish the subscription.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating one embodiment of a system that provides event service subscriptions and notifications between event systems;

FIG. 2 is a block diagram illustrating one embodiment of the event system that facilitates event service subscriptions and notifications;

FIG. 3 is a flowchart illustrating one embodiment of a method for re-establishing an event service subscription when a primary event server handling the subscription fails;

FIG. 5 is a flowchart illustrating one embodiment of a method for refreshing the event service subscription.

DESCRIPTION OF EXAMPLE EMBODIMENTS

Overview

Figure 4:
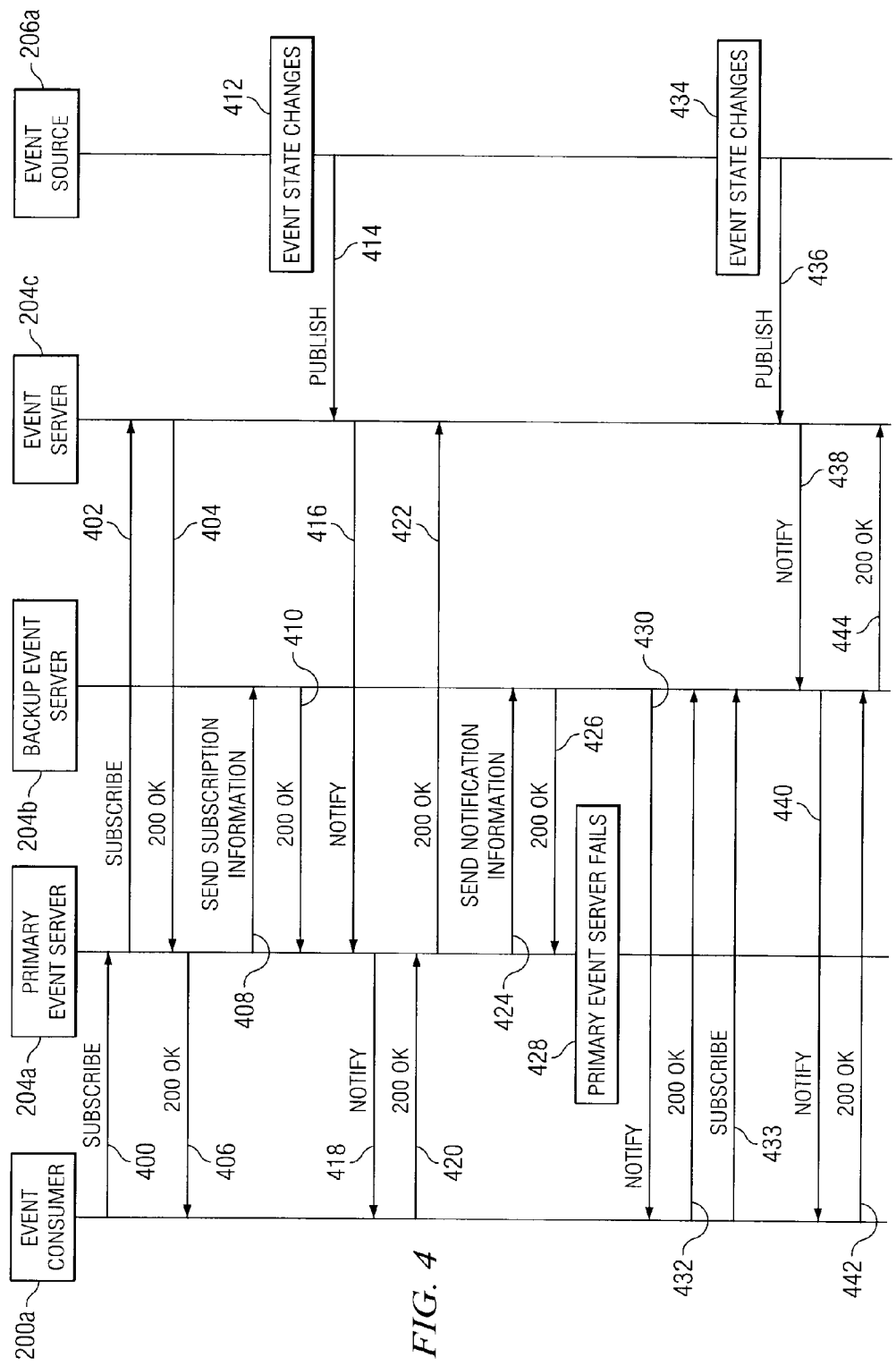
FIG. 4 is a call-flow diagram illustrating one embodiment of method for re-establishing the event service subscription when the primary event server handling the subscription fails.

In accordance with the present invention, disadvantages and problems associated with previous systems and methods for maintaining resiliency of subscriptions to an event server may be reduced or eliminated.

According to one embodiment of the present invention, a system and method for maintaining resiliency of subscriptions to an event server includes receiving a subscription request to establish a subscription to receive event state information of an event source, a primary event server providing the event state information. The event state information is received from the primary event server in accordance with the subscription request. The primary event server provides the event state information to an event consumer. It is determined whether the primary event server fails during the subscription.

Certain embodiments of the invention may provide one or more technical advantages. A technical advantage of one embodiment includes providing a backup event server to handle subscriptions when a primary event server fails. Failover to the backup event server occurs in a manner to minimize the possibility of a subscriber missing a notification from the event source. Another technical advantage includes providing a highly available and scalable event server solution. This solution provides for event consumers to receive notifications from a backup event server even if the primary event server fails. Furthermore, the event servers do not experience a simultaneous attempt by event consumers to re-establish subscriptions, which conventionally would cause the backup event server to become overwhelmed with subscriptions to be re-established.

Certain embodiments of the invention may include none, some, or all of the above technical advantages. One or more other technical advantages may be readily apparent to one skilled in the art from the figures, descriptions, and claims included herein.

Description

Embodiments of the present invention and its advantages are best understood by referring to FIGS. 1 through 5 of the drawings, like numerals being used for like and corresponding parts of the various drawings.

FIG. 1 is a block diagram illustrating one embodiment of a system 10 that provides event service subscriptions and notifications between event systems 100. System 10 includes event systems 100a and 100b that facilitate event service subscriptions and notifications within event system 100a and interactively with another event system 100b. Event systems 100 may communicate using transport network 102.

Event system 100 generates, maintains, and/or disseminates information relating to the event state of one or more users within system 10. An event system 100 may include enterprises, service providers, servers in a cluster, clusters in a domain, domains of a service provider, any other suitable system, or any suitable combination of the preceding. A user may include an entity, such as a person, a group of persons, and/or any appropriate hardware and controlling logic, capable of requesting and/or receiving event state information.

The event state information of a user includes information that identifies the status of the user in system 10. Event state information may include any suitable information that describes the location of the relevant user, the availability of that user, the reachability of the user, and/or the preferred modes of communication for the user for the purposes of communicating with other users. Examples of event state information include, but are not limited to, information indicating whether a user is currently logged into a particular network or component, information identifying a wireless network in which the user is currently located, information indicating whether the user has used a particular component of system 10 within a predetermined time period, information identifying an activity presently scheduled for the user, and information specifying a physical location of the user.

Transport network 102 allows event systems 100 to communicate with each other. Transport network 102 may include a public switched telephone network (PSTN), a local area network (LAN), a wide area network (WAN), any other public or private data network, a local, regional, or global communication network such as the Internet, an enterprise intranet, other suitable wireline or wireless communication link, or any combination of the preceding. Transport network 102 may include any combination of gateways, routers, hubs, switches, access points, base stations, and any other hardware and/or software that may implement any suitable protocol or communication.

In operation, event system 100a includes users that may desire to receive event state information from users in event system 100b, or vice versa, or users in event system 100 desire to receive event state information from users within the same event system 100. Transport network 102 facilitates the communication of event state information between event system 100b and event system 100a. For example, multiple users within event system 100a may desire to receive event state information from a user in event system 100b.

Event systems 100 provide a failover mechanism that allows users to continue receiving event state information if a failure occurs in event system 100. The failover mechanism includes using a primary server and a backup server to communicate event state information. The backup server takes over the communication of the event state information if the primary server fails.

Modifications, additions, or omissions may be made to system 10 without departing from the scope of the invention. For example, system 10 may include any suitable number of event systems 100 that communicate the event state information of users to other users.

FIG. 2 is a block diagram illustrating one embodiment of event system 100 that facilitates event service subscriptions and notifications. Event system 100 includes users that behave as event consumers 200, event sources 206, or any suitable combination of the preceding. Event sources 206 publish their event state for event consumers 200 that subscribe to the event state. Event servers 204 within clusters 202 facilitate the event service subscriptions and notifications between event consumers 200 and event sources 206. In an embodiment, the information flow in event system 100 is from event source 206a to event server 204c to event server 204a to event consumer 200a.

Event system 100 may support any suitable protocol that allows for event state information to be exchanged between event consumer 200 and event source 206. Such protocols include, but are not limited to, Session Initiation Protocol (SIP) and Extensionable Messaging and Presence Protocol (XMPP).

Event consumers 200 subscribe to the event state of event source 206 by making a subscription request. Event consumers 200 may be any suitable user that desires to track the event state of event source 206.

Event sources 206 generate event state information, such as presence information. Event sources 206 publish the event state information to event server 204 associated with event source 206. Event source 206 may be any suitable user that has event state information to which event consumers 200 may subscribe.

Clusters 202 each include multiple network elements. In the illustrated embodiment, clusters 202 include any suitable number of event servers 204. Each event server 204 in cluster 202 handles subscriptions for any event consumer 200, notifications for event source 206, or any suitable combination of the preceding. Load distribution mechanisms may spread the load across event servers 204 in cluster 202. Clusters 202 may include any suitable combination of other network elements in addition to event servers 204, such as proxy servers or application servers.

Event servers 204 facilitate event state communication between event consumers 200 and event sources 206. Event server 204 associates with event consumers 200, event sources 206, or any suitable combination of the preceding. Event server 204 handling a subscription for event consumer 200 maintains information associated with the subscription. The subscription information may include any suitable information such as dialog information and the current state of event source 206. Among other things, the subscription information acts as a record of event consumers 200 subscribing to event server 204 and event consumers 200 that need to be notified when an event state change occurs.

Each event source 206 has an associated event server 204 that enables event source 206 to provide event state information to event consumers 200. Event server 204 associated with event source 206 stores the event state information of event source 206 and sends notifications toward event consumers 200 having an active subscription to the event state of event source 206.

Each event consumer 200 has an associated primary event server 204 that enables event consumer 200 to subscribe to receive event state information of event source 206. Primary event server 204 receives a subscription request from event consumer 200 and notifies event consumer 200 of event state information according to the subscription request. The primary event server 204 associated with event consumer 200 stores subscriptions and/or notifications on behalf of event consumers 200, manages subscriptions and/or notifications on behalf of event consumers 200, passes subscription requests to corresponding event source 206 or associated event server 204 for fulfillment, and/or performs any other suitable action that facilitates the communication between elements within event system 100.

Each event source 206 may also associate with primary event server 204 that provides event state information to event consumers 200. Primary event server 204 stores the event state information of event source 206 and sends notifications to any event consumers 200 having an active subscription to receive the event state information.

In addition to primary event server 204, each event consumer 200 has an associated backup event server 204. Backup event server 204 handles the subscriptions of event consumers 200 if primary event server 204 fails. Primary event server 204 may fail for any suitable reason, such as a power outage, failure of hardware, or failure of network connections. In an embodiment, primary event server 204 fails, backup event server 204 notifies event consumer 200 of the failure by sending a notification to event consumer 200. The notification includes any suitable information, such as a notification that the subscription with primary event server 204 has been terminated, and/or a notification that backup event server 204 is handling the subscription.

Backup event server 204 may send the notifications to event consumers 200 at any suitable time, such as sending the notifications at a configurable frequency. In an embodiment, backup event server 204 sends the notification when the event state of event source 206 changes. Therefore, event consumer 200 may receive the event state change without waiting for backup event server 204 to finish taking over each subscription previously handled by primary event server 204.

When backup event server 204 takes over the subscription, event consumers 200 receive event state information of event source 206 from backup event server 204, including information of event state changes that occurred between the time primary event server 204 failed and the time backup event server 204 took over. When backup event server 204 takes over the subscription for event consumer 200, backup event server 204 may have another event server 204 act as the backup if it fails. Primary event server 204 and backup event server 204 within cluster 202 may be configured for any suitable number of sequential failures.

In operation, event consumer 200a sends a subscription request to subscribe to the event state of event source 206a. Primary event server 204a receives the subscription request and selects a backup event server 204b to act as the backup to the subscription. When event source 206a changes its event state, the event state information is published to event server 204c associated with event source 206a. Event server 204c forwards the event state change to primary event server 204a, and primary event server 204a forwards the event state change to event consumer 200a.

If primary event server 204a fails, backup event server 204b takes over the subscription. When backup event server 204b takes over the subscription, it may send a notification to event consumer 200a or provide event state information to event consumer 200a without sending a notification. The notification informs event consumer 200a that primary event server 204a has failed and backup event server 204b is handling the subscription. Therefore, when event source 206a publishes an event state change to event server 204c, event server 204c forwards the event state change to backup event server 204b, and backup event server 204b forwards the event state change to event consumer 200a.

Modifications, additions, or omissions may be made to event system 100. For example, event system 100 may include any suitable number of event consumers 200, event sources 206, clusters 202, or event servers 204. As another example, when backup event server 204 takes over for primary event server 204, another event server 204 may act as the backup for the backup event server 204.

FIG. 3 is a flowchart illustrating one embodiment of a method for re-establishing an event service subscription when a primary event server handling the subscription fails. The method may be used by any suitable system, such as system 10 of FIG. 1.

The method starts at step 300 when a primary event server 204a receives a new subscription request from event consumer 200a. The subscription request allows event consumer 200a to receive event state information about event source 206a. At step 302, primary event server 204a selects a backup event server 204b for the subscription request. Primary event server 204a selects backup event server 204b in the same cluster 202a. Primary event server 204a may select backup event server 204b using any suitable method, such as randomly selecting backup event server 204b or selecting a backup event server 204b based on the server load in cluster 202a. As another example, primary event server 204a may select a backup event server 204b for each subscription request using different methods. In an embodiment, each subscription request hosted by primary event server 204a has a different backup event server 204b.

When backup event server 204b is selected, primary event server 204a sends information about the subscription to backup event server 204b at step 303. Backup event server 204b creates a latent subscription that mirrors the active subscription established by the subscription request. The latent subscription allows backup event server 204b to know where to send a notification about the failure of primary event server 204a and to take over the subscription, or allows backup event server 204b to take over the subscription without sending a notification. Latent subscriptions differ from active subscriptions in that they do not generate notifications for event consumer 200a, and do not publish event state information.

Primary event server 204a receives event state information from event source 206a at step 304 for which event consumer 200a has requested a subscription. At step 306, the event state of event source 206a may change. If event source 206a changes its event state, primary event server 204a notifies event consumer 200a and backup event server 204b of the event state change at step 308. In an embodiment, primary event server 204a notifies backup event server 204a of the event state change using any suitable intra-cluster notification mechanism, such as a live bus. The notification provided to backup event server 204b may include any suitable information, such as the identification of the event or identification information of event consumer 200a. The method then proceeds to step 310. If the event state of event source 206a does not change at step 306, the method proceeds directly to step 310.

The primary event server 204a may fail at step 310. If primary event server 204a does not fail, the method returns to step 304, where primary event server 204a continues to receive event state information. If primary event server 204a fails, backup event server 204b sends a notification of the failure at step 312 to event consumer 200a impacted by the failure of primary event server 204. The notification informs event consumer 200a that primary event server 204a has failed and that backup event server 204b has taken over as the host of the subscription. The notification may update a contact header field to point to backup event server 204b, or provide other suitable information to direct event consumer 200a to use backup event server 204b for the subscription. Additionally, the notification may include new event state information. In another embodiment, backup event server 204b does not send a notification of the failure to primary event server 204a, but takes over the subscription without informing event consumer 200a. In this embodiment, the failover from primary event server 204a to backup event server 204b is transparent to event consumer 200a. Event consumer 200a may now send additional requests to backup event server 204b instead of primary event server 204a.

Because backup event server 204b replaces primary event server 204a as the host for event consumer 200a, backup event server 204b receives event state information at step 314. Event source 206a may experience an event state change at step 316. If the event state changes, backup event server 204b notifies event consumer 200a at step 318. Backup event server 204b continues to receive event state information until the subscription expires at step 320. If the event state does not change, backup event server 204b continues to receive event state information if the subscription has not expired. When the subscription expires at step 320, the method may end.

Modifications, additions, or omissions may be made to the method. For example, primary event server 204a may notify backup event server 204b of changes to the subscription in addition to the event state changes to event source 206a. Such changes include subscription creation, changes in subscription expiration time, or other suitable information. As another example, backup event server 204b may select another event server 204 within the same cluster 202a to act as its backup event server 204b upon taking over the subscription from primary event server 204a. The method may include more, fewer, or other steps. As yet another example, event consumer 200a may refresh the subscription and continue to receive event state information from primary event server 204a or backup event server 204b. Additionally, steps may be performed in any suitable order without departing from the scope of the invention.

FIG. 4 is a call-flow diagram illustrating one embodiment of method for re-establishing the event service subscription when the primary event server handling the subscription fails. The call-flow may use any signaling protocol to communicate, such as a subscription dialog as the signaling relationship. A subscription dialog starts with a SUBSCRIBE request and terminates when the subscription expires based on the expiration time included in the SUBSCRIBE request.

Event consumer 200a sends a subscription request to primary event server 204a at message 400 to receive event state information about event source 206a. The subscription request may include any suitable information, such as the event source 206 and the expiration time of the subscription.

Because event source 206a publishes its event state information to event server 204c, primary event server 204a forwards the subscription request to event server 204c at message 402. Event server 204c confirms receipt of the subscription request by sending a 200OK to primary event server 204a at message 404. Primary event server 204a forwards the 200OK to event consumer 200a at message 406.

Primary event server 204a selects a backup event server 204b and informs backup event server 204b of the subscription information at message 408. The subscription information allows backup event server 204b to takeover if primary event server 204a fails. Backup event server 204b sends a 200OK to primary event server 204a to confirm receipt of the subscription information at message 410.

At instance 412, the event state of event source 206a changes. Event source 206a publishes its event state information to its associated event server 204c at message 414. Event server 204c sends a notify message to primary event server 204a at message 416. Primary event server 204a forwards the notify message that includes the event state of event server 206a to event consumer 200a at message 418.

Event consumer 200a confirms receipt of the notification by forwarding a 200OK to primary event server 204a at message 420. Primary event server 204a forwards the 200OK to event server 204c at message 422. Primary event server 204a sends notification information to backup event server 204b of the event state change at message 424. Primary event server 204a provides the notification information to backup event server 204b in addition to event consumer 200a to ensure backup event server 204b is able to takeover the subscription request if primary event server 204a fails. Backup event server 204b sends a 200OK to confirm receipt of the notification information at message 426.

At instance 428, primary event server 204a fails. Backup event server 204b notifies event consumer 200a of the failure and informs event consumer 200a that it is now the host for the subscription. The notification updates the contact header field to point to backup event server 204b. Event consumer 200a confirms the notification by sending a 200OK to backup event server 204b at message 432. Event consumer 200a sends a refresh SUBSCRIBE request to backup event server 204b at message 433.

At instance 434, event source 206a changes its event state. Event source 206a informs event server 204c of the change by publishing the event state change at message 436. Event server 204c forwards the event state change to a notification of backup event server 204b at message 438. Backup event server 204b forwards the event state change to event consumer 200a at message 440. Event consumer 200a confirms the notification by sending a 200OK to backup event server 204b at message 442, and backup event server 204b forwards the 200OK to event server 204c at message 444.

Modifications, additions, or omissions may be made to the call-flow. For example, primary event server 204a may forward the subscription request to event server 204c and backup event server 204b simultaneously. The call-flow may include more, fewer, or other messages. Additionally, messages may be performed in any suitable order.

FIG. 5 is a flowchart illustrating one embodiment of a method for refreshing an event service subscription. The method may be used by any suitable system, such as system 10 of FIG. 1.

The method starts at step 500 when event consumer 200 receives event state information about event source 206. The event state information is based on a subscription request event consumer 200 sent to event server 204. At step 502, it is determined whether the subscription expires. If the subscription has not expired, event consumer 200 continues to receive the event state information. If the subscription expires, it is determined whether to refresh the subscription at step 504. The method ends if a determination is made not to refresh the subscription.

If it is determined to refresh the subscription, event consumer 200 determines whether primary event server 204a failed during the subscription at step 506. If primary event server 204a has not failed, event consumer 200 sends a refresh request to primary event server 204a at step 508. If primary event server 204a has failed, event consumer 200 sends the refresh request to backup event server 204b at step 510. Event consumer 200 may send the refresh request to backup event server 204b according to information received in a notification after primary event server 204a failed. When event consumer 200 sends the refresh request to either primary event server 204a or backup event server 204b, event consumer 200 continues to receive event state information from the appropriate event server.

Modification, additions, or omissions may be made to the method. The method may include more, fewer, or other steps. Additionally, steps may be performed in any suitable order.

Certain embodiments of the invention may provide one or more technical advantages. A technical advantage of one embodiment includes providing a backup event server to handle subscriptions when a primary event server fails. Failover to the backup event server occurs in a manner to minimize the possibility of a subscriber missing a notification from the event source. Another technical advantage includes providing a highly available and scalable event server solution. This solution provides for event consumers to receive notifications from a backup event server even if the primary event server fails. Furthermore, the event servers do not experience a simultaneous attempt by event consumers to re-establish subscriptions, which conventionally would cause the backup event server to become overwhelmed with subscriptions to be re-established.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the scope and spirit of this disclosure, as defined by the following claims.

What is claimed is:

1. A method for maintaining resiliency of subscriptions to an event server, comprising:

receiving, at a primary event server, a subscription request to communicate event state information about an event source;

establishing, by the primary event server, an active subscription according to the subscription request;

selecting a backup event server to handle the subscription request if the primary event server fails, wherein the backup event server establishes a latent subscription according to the subscription request;

communicating the event state information from the primary event server to an event consumer and the backup event server in accordance with the subscription request;

determining whether the primary event server fails during the active subscription; and if the primary event server fails, updating a header field of the event consumer to point to the backup event server for the active subscription.

2. The method of claim 1, wherein communicating the event state information comprises communicating the event state information through an intra-cluster notification mechanism.

3. The method of claim 1, further comprising:
facilitating take over of the active subscription by the backup event server from the primary event server if the primary event server fails; and
facilitating management of the active subscription by the backup event server in accordance with the subscription request if the primary event server fails.

4. The method of claim 1, further comprising:
informing the event consumer that the primary event server has failed; and
informing the event consumer that the backup event server manages the active subscription.

5. The method of claim 1, further comprising communicating the event state information from the backup server to the event consumer in accordance with the subscription request if the primary event server fails.

6. The method of claim 1, further comprising communicating a notification to the event consumer if the primary event server fails.

7. The method of claim 6, wherein communicating the notification to the event consumer comprises communicating the notification to the event consumer when an event state of the event source changes.

8. The method of claim 6, wherein communicating the notification to the event consumer comprises communicating the notification to the event consumer when the primary event server fails.

9. A system for maintaining resiliency of subscriptions to an event server, comprising:
one or more event consumers operable to subscribe to receive event state information from one or more event sources by requesting to establish a subscription;
a primary event server operable to:
receive a subscription request from the one or more event consumers;
establish an active subscription according to the subscription request;
select a backup event server to handle the subscription request if the primary event server fails, wherein the backup event server establishes a latent subscription according to the subscription request;
communicate the subscription request to the backup event server; and
communicate event state information in accordance with the subscription request to the one or more event consumers and the backup event server; and
the backup event server operable to:
determine whether the primary event server fails during the active subscription; and
if the primary event server fails, update a header field of the one or more event consumers to point to the backup event server for the active subscription.

10. The system of claim 9, the primary event server further operable to communicate the event state information to the backup event server through an intra-cluster notification mechanism.

11. The system of claim 9, the backup event server further operable to:
facilitate take over of the active subscription by the backup event server from the primary event server if the primary event server fails; and
facilitate management of the active subscription by the backup event server in accordance with the subscription request if the primary event server fails.

12. The system of claim 9, the backup event server further operable to:
inform the one or more event consumers that the primary event server has failed; and
inform the one or more event consumers that the backup event server manages the active subscription.

13. The system of claim 9, the backup event server further operable to communicate the event state information to the one or more event consumers in accordance with the subscription request if the primary event server fails.

14. The system of claim 9, the backup event server further operable to communicate a notification to the one or more event consumers if the primary event server fails.

15. The system of claim 14, wherein the backup event server communicates the notification to the one or more event consumers when an event state of the one or more event sources changes.

16. The system of claim 14, wherein the backup event server communicates the notification to the event consumer when the primary event server fails.

17. A system for maintaining resiliency of subscriptions to an event server, comprising:
means for receiving a subscription request to communicate event state information about an event source;
means for establishing, by the primary event server, an active subscription according to the subscription request;
means for selecting a backup event server to handle the subscription request if the primary event server fails, wherein the backup event server establishes a latent subscription according to the subscription request;
means for communicating the event state information from the primary event server to an event consumer and the backup event server in accordance with the subscription request,
means for determining whether the primary event server fails during the active subscription; and
means for updating a header field of the event consumer to point to the backup event server for the active subscription if the primary event server fails.

* * * * *